Sept. 22, 1925.
G. DELK ET AL
RESILIENT TIRE
Filed Sept. 12, 1924
1,554,625
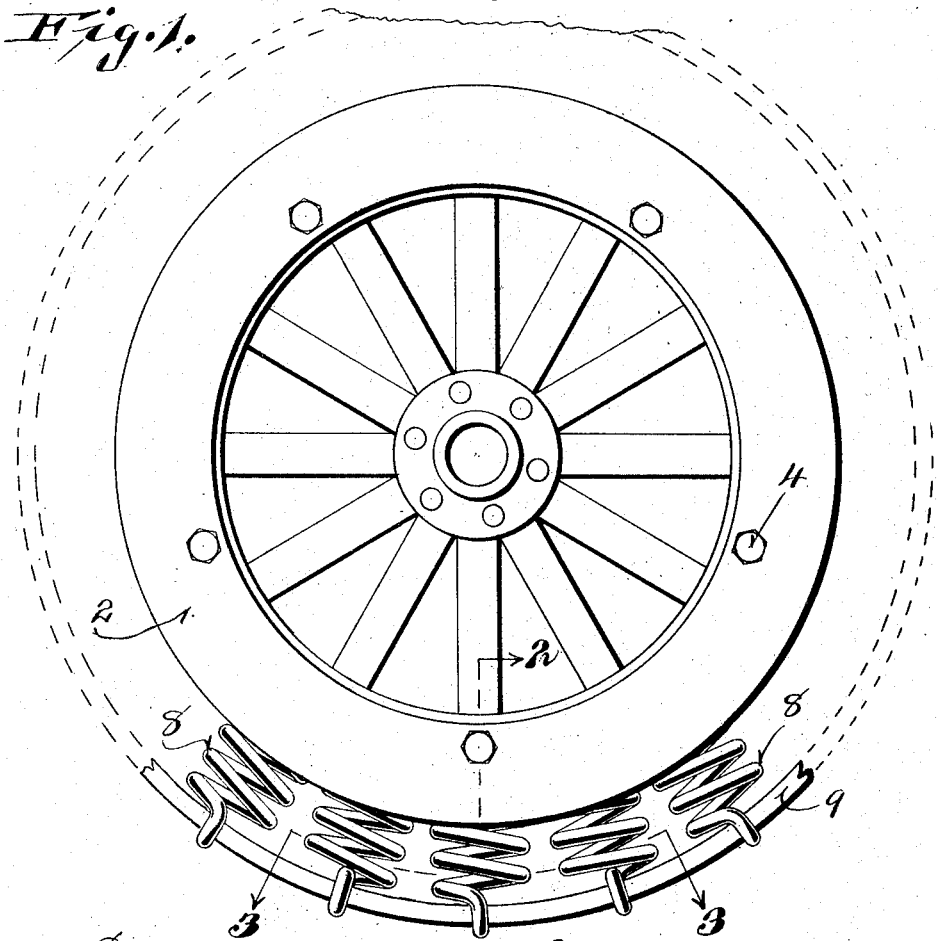
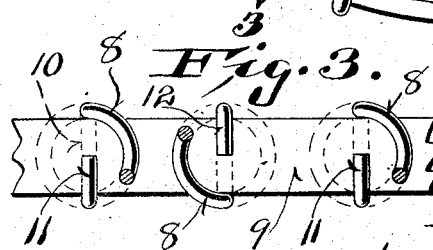
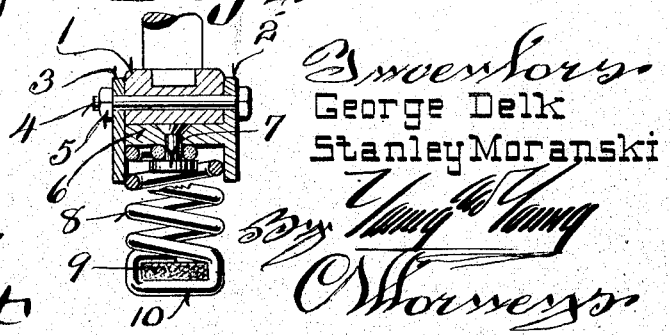
Inventors
George Delk
Stanley Moranski Patented Sept. 22, 1925.

1,554,625

UNITED STATES PATENT OFFICE.

GEORGE DELK AND STANLEY MORANSKI, OF SOUTH MILWAUKEE, WISCONSIN.

RESILIENT TIRE.

Application filed September 12, 1924. Serial No. 737,313.

*To all whom it may concern:*

Be it known that we, GEORGE DELK and STANLEY MORANSKI, both citizens of the United States, and residents of South Milwaukee, in the county of Milwaukee and State of Wisconsin, have invented certain new and useful Improvements in Resilient Tires; and we do hereby declare that the following is a full, clear, and exact description thereof.

This invention relates to resilient tires.

Objects of this invention are to provide a resilient tire which will slip over the usual felly of an automobile wheel, which does not require a complete reconstruction of the automobile wheel for its use, but which is adapted to cooperate with any of the usual types of wheels with a minimum of change.

Further objects are to provide a resilient tire which is bodily removable as a unit, which is so constructed that a damaged or broken tire may be most quickly replaced by a new tire, and in which any of the usual small irregularities met in a roadway are accommodated by a yielding of the tire itself as in a pneumatic tire, and further which is so constructed that large obstructions are also easily accommodated.

An embodiment of the invention is shown in the accompanying drawings, in which:—

Figure 1 is a side elevation of a wheel equipped with this tire.

Figure 2 is a sectional view on the line 2—2 of Figure 1.

Figure 3 is a developed sectional view on the line 3—3 of Figure 1.

Referring now to the drawings, it will be seen that a wheel of any usual type may be employed which has felly 1. A pair of plate rings or retaining rings 2 and 3 are secured to the felly of the wheel in any suitable manner as by means of headed bolts 4 provided with removable nuts 5.

The tire comprises an annular metal member or inner ring 6 to which a plurality of headed members 7 are secured by riveting or in any equivalent manner. These headed members have the inner ends of a series of regularly spaced helical springs secured thereto, as clearly shown in Figure 2. The outer portion or peripheral part of the tire comprises a heavy flexible continuous band 9 to which the ends of the springs 8 are secured. This band is of extremely tough fibrous or fabric material and is freely yieldable throughout its extent. It is held in a very taut condition due to the outward pressure of the several springs 8.

In order to secure this peripheral flexible ring in position without the use of additional fastening means each of the springs is provided with an encircling portion 10 which passes over the outer side of the flexible ring or band 9.

It is to be particularly noted, however, from reference to Figures 1 and 2, that the outer ends of the springs are bent transversely of the ring 9 but extend in opposite directions. In other words every other spring 8 is provided with a finger 11 which extends from one side of the strap or band 9 towards the other, while the next adjacent spring is provided with a finger 12 which extends from the opposite side of the band. This alternate arrangement of hooks or fingers 11 and 12 securely prevents disengagement of the band from these fingers due to any lateral shifting of the band. The springs are relatively closely spaced and the alternate arrangement of fingers precludes any possibility of inadvertent detachment of the band.

It is to be particularly noted that although the device is primarily intended for automobile wheels that, nevertheless, it may be applied to the wheels of other types of vehicles, as is obvious. Further, it is to be noted that not only will the tire yield at the springs but will also yield intermediate the springs due to the flexible nature of the tightly stretched band 9.

It is further to be noted that the tire as a whole may be most readily removed from the wheel by detaching the nuts 5 and removing and retaining the annular plate or ring 3. Thereafter, the tire may be slipped bodily from the felly of the wheel and a new tire substituted.

It will thus be seen that a resilient tire has been provided which is adapted for use upon standard types of wheels, which possesses the characteristic of yielding not only to large obstructions but also to small obstructions due to the inherent flexibility of the peripheral portion and due to the fact that such peripheral portion is maintained under tension at all times by the outward pressure of the springs.

It will further be seen that this resilient tire may be most easily manufactured in a relatively simple and cheap manner, and that it possesses characteristics analogous to those possessed by a pneumatic tire.

Although the invention has been described in considerable detail, it is to be understood that the invention may be variously embodied and is, therefore, to be limited only as claimed.

We claim:

The combination of a wheel having a felly, a resilient tire postioned upon said felly and having a metal band surrounding said felly, a pair of annular rings bolted to said felly and retaining said metal band in position, a plurality of radially arranged helical springs rigidly secured to said metal band, said springs being positioned between said annular rings and a peripherally arranged flexible fabric band surrounding the outer ends of said springs, and tensioned thereby, said springs being folded around and enclosing said fabric band and having fingers located on the inner side of said band and extending in opposite directions across such inner side, each of said springs being separate and distinct and free from attachment to the adjacent spring.

In testimony that we claim the foregoing we have hereunto set our hands at South Milwaukee, in the county of Milwaukee and State of Wisconsin.

GEORGE DELK.
STANLEY MORANSKI.